United States Patent
Okumura

(10) Patent No.: US 11,333,961 B2
(45) Date of Patent: May 17, 2022

(54) WAVELENGTH CONVERTER, LIGHT SOURCE APPARATUS, AND PROJECTOR

(71) Applicant: SEIKO EPSON CORPORATION, Tokyo (JP)

(72) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/084,866

(22) Filed: Oct. 30, 2020

(65) Prior Publication Data

US 2021/0132483 A1 May 6, 2021

(30) Foreign Application Priority Data

Nov. 1, 2019 (JP) .............................. JP2019-199702

(51) Int. Cl.
  *G03B 21/20* (2006.01)
(52) U.S. Cl.
  CPC .................................. *G03B 21/204* (2013.01)
(58) Field of Classification Search
  None
  See application file for complete search history.

(56) References Cited

U.S. PATENT DOCUMENTS

| | | | |
|---|---|---|---|
| 2013/0286633 A1 | 10/2013 | Rodriguez et al. | |
| 2014/0021504 A1 | 1/2014 | Onishi | |
| 2016/0161644 A1 | 6/2016 | Verschuuren et al. | |
| 2016/0190403 A1 | 6/2016 | Verschuuren et al. | |
| 2017/0082785 A1 | 3/2017 | Verschuuren et al. | |
| 2017/0089546 A1 | 3/2017 | Verschuuren et al. | |
| 2018/0024279 A1 | 1/2018 | Murai et al. | |

FOREIGN PATENT DOCUMENTS

| | | |
|---|---|---|
| JP | 2014-508379 A | 4/2014 |
| JP | 2016-534554 A | 11/2016 |
| JP | 2016-535304 A | 11/2016 |
| JP | 2017-517891 A | 6/2017 |
| JP | 2017-519337 A | 7/2017 |
| JP | 2017-157488 A | 9/2017 |
| JP | 2018-013688 A | 1/2018 |
| WO | 2012/131793 A1 | 10/2012 |

*Primary Examiner* — Vip Patel
(74) *Attorney, Agent, or Firm* — Dority & Manning, P.A.

(57) ABSTRACT

A wavelength converter according to the present disclosure includes a wavelength conversion layer that has a first surface and a second surface, converts first light that belongs to a first wavelength band into second light that belongs to a second wavelength band, and emits the second light via the first surface, a transparent member having a third surface and a fourth surface, the third surface so provided as to face the first surface of the wavelength conversion layer, and a plurality of nano-antennas provided on the fourth surface of the transparent member. The wavelength conversion layer contains light scatterers, and the plurality of nano-antennas selectively emit third light that belongs to a specific wavelength band out of the second wavelength band along the direction of a normal to the fourth surface.

9 Claims, 6 Drawing Sheets

WAVELENGTH CONVERTER, LIGHT SOURCE APPARATUS, AND PROJECTOR

The present application is based on, and claims priority from JP Application Serial Number 2019-199702, filed Nov. 1, 2019, the disclosure of which is hereby incorporated by reference herein in its entirety.

BACKGROUND

1. Technical Field

The present disclosure relates to a wavelength converter, a light source apparatus, and a projector.

2. Related Art

As a light source apparats used in a projector, there has been a proposed light source apparatus using fluorescence emitted from a phosphor irradiated with excitation light. JP-A-2018-13688 discloses a wavelength conversion apparatus including a wavelength conversion element that converts the wavelength of light incident thereon to produce wavelength converted light and an antenna array including a plurality of antennas formed on the wavelength conversion element and arranged in a cycle approximately equal to the optical wavelength of the wavelength converted light in the wavelength conversion element.

JP-A-2018-13688 describes that when the antenna array is irradiated with light, surface plasmon resonance localized at the individual antennas adjacent to each other undergoes optical-diffraction-induced resonance, resulting in an increases in the intensity of the electric field, whereby the wavelength converted light extraction efficiency is improved, and a narrow-angle light orientation distribution is provided. In the wavelength conversion apparatus described in JP-A-2018-13688, it is inferred that the wavelength conversion element does not scatter light because the light having passed through and exited out of the wavelength conversion element but having not been converted in terms of wavelength also maintains the narrow-angle light orientation distribution of the laser light. In the configuration in which the wavelength conversion element does not scatter, however, the phosphor does not sufficiently absorb the excitation light, resulting in a problem of a difficulty in achieving high wavelength conversion efficiency.

SUMMARY

A wavelength converter according to an aspect of the present disclosure includes a wavelength conversion layer that has a first surface and a second surface, converts first light that belongs to a first wavelength band into second light that belongs to a second wavelength band different from the first wavelength band, and emits the second light via the first surface, a transparent member having a third surface and a fourth surface, the third surface so provided as to face the first surface of the wavelength conversion layer, and a plurality of nano-antennas provided on the fourth surface of the transparent member. The wavelength conversion layer contains light scatterers, and the plurality of nano-antennas selectively emit third light that belongs to a specific wavelength band out of the second wavelength band along a direction of a normal to the fourth surface.

The wavelength converter according to the aspect of the present disclosure may further include a protective layer that is so provided on the fourth surface of the transparent member as to cover the plurality of nano-antennas and transmits at least the second light.

In the wavelength converter according to the aspect of the present disclosure, a refractive index of the protective layer may differ from a refractive index of the transparent member.

The wavelength converter according to the aspect of the present disclosure, when so configured that the first light enters the wavelength conversion layer via the first surface, may further include a reflection layer that is so provided as to face the second surface of the wavelength conversion layer and reflects at least the second light.

The wavelength converter according to the aspect of the present disclosure, when so configured that the first light enters the wavelength conversion layer via the second surface, may further include a dichroic layer that is so provided as to face the second surface of the wavelength conversion layer, transmits the first light, and reflects the second light.

In the wavelength converter according to the aspect of the present disclosure, a peak wavelength of the third light may differ from a peak wavelength of the second light.

In the wavelength converter according to the aspect of the present disclosure, the first light may be light that belongs to a blue wavelength band, the peak wavelength of the second light may fall within a green wavelength band, and the peak wavelength of the third light may fall within a red wavelength band.

A light source apparatus according to another aspect of the present disclosure includes the wavelength converter according to the aspect of the present disclosure and a light source that emits excitation light formed of the first light toward the wavelength converter.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 6.

In the following drawings, components are drawn at different dimensional scales in some cases for clarity of each of the components.

An example of a projector according to the present embodiment will be descried.

Figure 1:
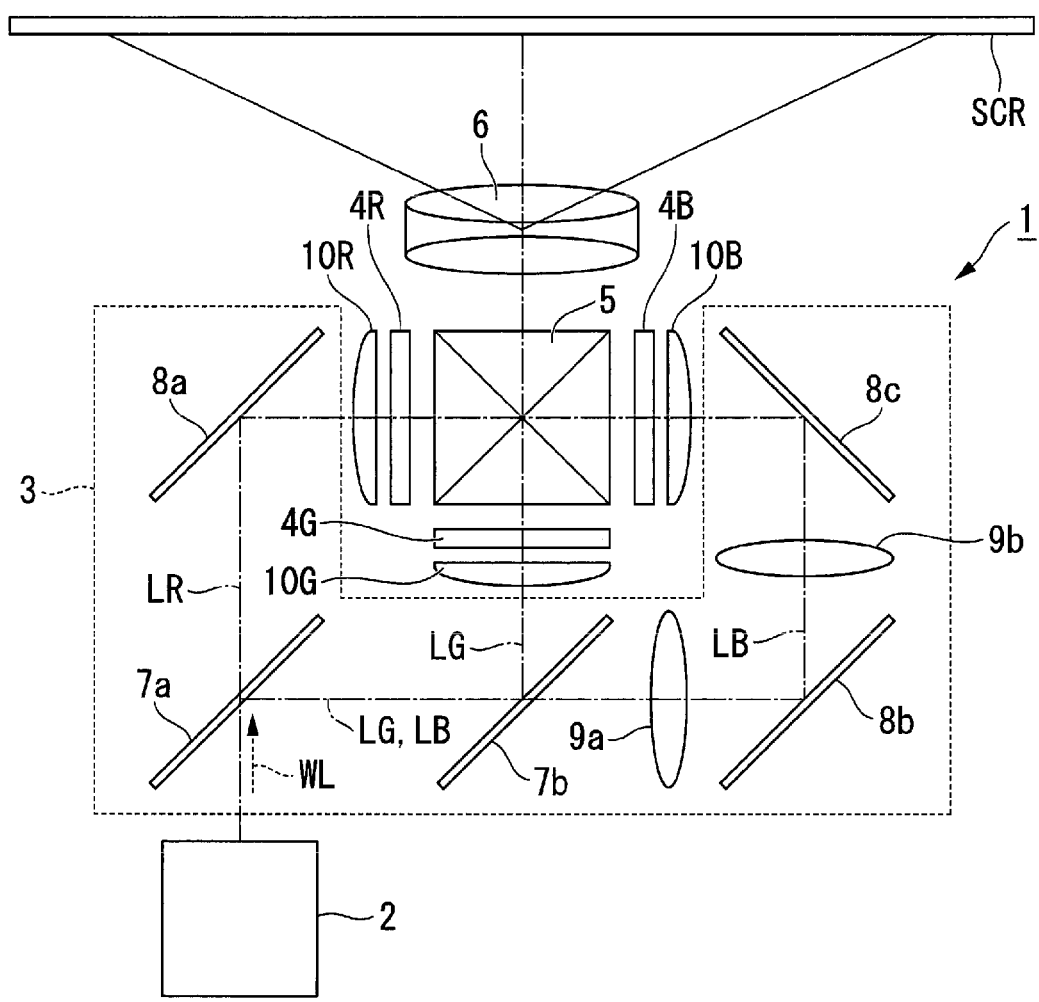
FIG. 1 is a schematic configuration diagram of a projector according to a first embodiment.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes an illuminator 2, a color separation system 3, a light modulator 4R, a light modulator 4G, a light modulator 4B, a light combining system 5, and a projection optical apparatus 6. The configuration of the illuminator 2 will be described later.

The color separation system 3 includes a first dichroic mirror 7a, a second dichroic mirror 7b, a reflection mirror 8a, a reflection mirror 8b, a reflection mirror 8c, a relay lens 9a, and a relay lens 9b. The color separation system 3 separates white illumination light WL emitted from the illuminator 2 into red light LR, green light LG, and blue light LB, guides the red light LR to the light modulator 4R, guides the green light LG to the light modulator 4G, and guides the blue light LB to the light modulator 4B.

A field lens 10R is disposed between the color separation system 3 and the light modulator 4R, substantially parallelizes the incident red light LR, and causes the resultant red light LR to travel toward the light modulator 4R. A field lens 10G is disposed between the color separation system 3 and the light modulator 4G, substantially parallelizes the incident green light LG, and causes the resultant green light LG to travel toward the light modulator 4G. A field lens 10B is disposed between the color separation system 3 and the light modulator 4B, substantially parallelizes the incident blue light LB, and causes the resultant blue light LB to travel toward the light modulator 4B.

The first dichroic mirror 7a transmits a red optical component and reflects a green optical component and a blue optical component. The second dichroic mirror 7b reflects the green optical component and transmits the blue optical component. The reflection mirror 8a reflects the red optical component. The reflection mirrors 8b and 8c reflect the blue optical component.

The red light LR having passed through the first dichroic mirror 7a is reflected off the reflection mirror 8a, passes through the field lens 10R, and is incident on an image formation region of the light modulator 4R for red light. The green light LG reflected off the first dichroic mirror 7a is further reflected off the second dichroic mirror 7b, passes through the field lens 10G, and is incident on an image formation region of the light modulator 4G for green light. The blue light LB having passed through the second dichroic mirror 7b travels via the relay lens 9a, the light-incident-side reflection mirror 8b, the relay lens 9b, the light-exiting-side reflection mirror 8c, and the field lens 10B and is incident on an image formation region of the light modulator 4B for blue light.

The light modulators 4R, 4G, and 4B each modulate the color light incident thereon in accordance with image information to form an image light flux. The light modulators 4R, 4G, and 4B are each formed of a liquid crystal light valve. Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining system 5 combines the image light fluxes emitted from the light modulators 4R, 4G, and 4B with one another to form full-color image light. The light combining system 5 is formed of a cross dichroic prism formed of four right angled prisms so bonded to each other to form a substantially square shape in the plan view. Dielectric multilayer films are formed along the substantially X-letter-shaped interface between the right angled prisms bonded to each other.

The image light having exited out of the light combining system 5 is enlarged and projected by the projection optical apparatus 6 to form an image on the screen SCR. That is, the projection optical apparatus 6 projects the light fluxes modulated by the light modulators 4R, 4G, and 4B. The projection optical apparatus 6 is formed of a single projection lens or a plurality of projection lenses.

An example of the illuminator 2 in the present embodiment will be described.

Figure 2:
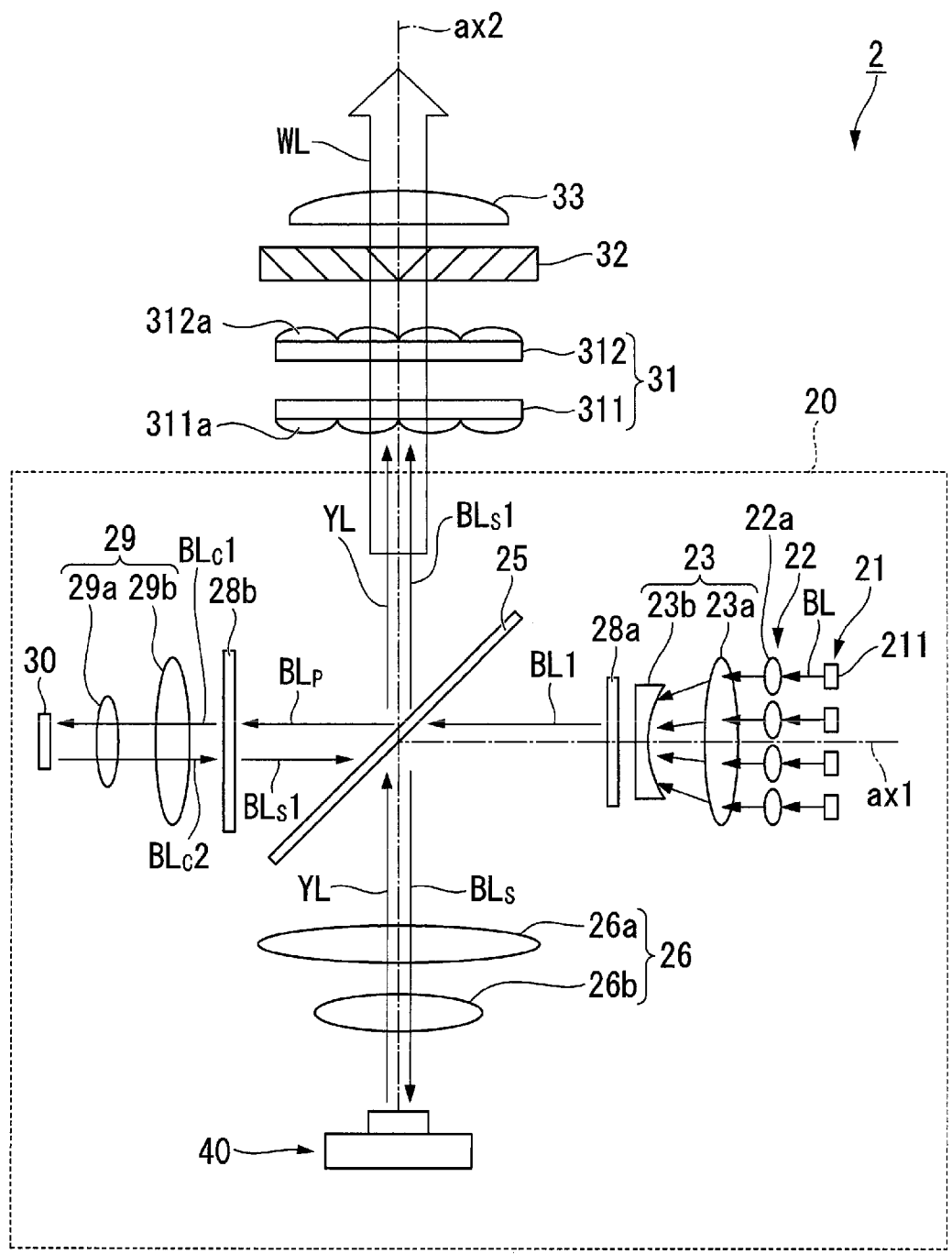
FIG. 2 is a schematic configuration diagram of an illuminator in the first embodiment.

FIG. 2 shows a schematic configuration of the illuminator 2.

The illuminator 2 includes a light source apparatus 20, an optical integration system 31, a polarization converter 32, and a superimposing lens 33, as shown in FIG. 2. The optical integration system 31 and the superimposing lens 33 form a superimposing system.

The light source apparatus 20 includes an array light source 21, a collimator system 22, an afocal system 23, a first retardation film 28a, a polarization separator 25, a first light collection system 26, a wavelength converter 40, a second retardation film 28b, a second light collection system 29, and a diffusive reflector 30.

The array light source 21, the collimator system 22, the afocal system 23, the first retardation film 28a, the polarization separator 25, the second retardation film 28b, the second light collection system 29, and the diffusive reflector 30 are sequentially arranged along an optical axis ax1. The wavelength converter 40, the first light collection system 26, the polarization separator 25, the optical integration system 31, the polarization converter 32, and the superimposing lens 33 are sequentially arranged along an illumination optical axis ax2. The optical axis ax1 and the illumination optical axis ax2 are present in the same plane and perpendicular to each other. The illumination optical axis ax2 is an axis extending along the chief ray of the illumination light WL emitted from the illuminator 2.

The array light source 21 includes a plurality of semiconductor lasers 211, which each serve as a solid-state light source. The plurality of semiconductor lasers 211 are arranged in an array in a plane perpendicular to the optical axis ax1. The semiconductor lasers 211 each emit a blue light beam BL (first light), which belongs to a first wavelength band, specifically, a light beam that belongs to a wavelength band, for example, from 450 to 460 nm and has a peak wavelength of 455 nm. The array light source 21 emits a light beam flux formed of a plurality of light beams BL. The array light source 21 in the present embodiment corresponds to the "light source" in the appended claims.

The light beams BL emitted from the array light source 21 enter the collimator system 22. The collimator system 22 converts the light beams BL emitted from the array light source 21 each into parallelized light. The collimator system 22 is formed of a plurality of collimator lenses 22a arranged in an array. The plurality of collimator lenses 22a are disposed in correspondence with the plurality of semiconductor lasers 211.

The light beams BL having passed through the collimator system 22 enter the afocal system 23. The afocal system 23 adjusts the thickness (diameter) of the light beam flux formed of the plurality of light beams BL. The afocal system 23 is formed, for example, of a convex lens 23a and a concave lens 23b.

The light beams BL having passed through the afocal system 23 enter the first retardation film 28a. The first retardation film 28a is, for example, a half wave plate configured to be rotatable around the optical axis ax1. The light beams BL emitted from the semiconductor lasers 211 are each linearly polarized light. Appropriately setting the angle of rotation of the first retardation film 28a allows the light beams BL passing through the first retardation film 28a to each be converted into a light beam containing an S-polarized component and a P-polarized component with respect to the polarization separator 25 mixed with each other at a predetermined ratio. The ratio between the S-polarized component and the P-polarized component can be changed by rotating the first retardation film 28a.

The light beams BL each containing the S-polarized component and the P-polarized component produced when the light beam BL passes through the first retardation film 28a are incident on the polarization separator 25. The polarization separator 25 is formed, for example, of a polarization beam splitter having wavelength selectivity. The polarization separator 25 is so disposed as to incline by 45° with respect to the optical axis ax1 and the illumination optical axis ax2.

The polarization separator 25 has a polarization separation function of separating each of the light beams BL incident thereon into a light beam BLs, which is formed of the S-polarized component with respect to the polarization separator 25, and a light beam BLp, which is formed of the P-polarized component with respect to the polarization separator 25. Specifically, the polarization separator 25 reflects the light beams BLs, which are each formed of the S-polarized component, and transmits the light beams BLp, which are each formed of the P-polarized component. The polarization separator 25 further has a color separation function of transmitting a yellow optical component, which belongs to a wavelength band different from the wavelength band to which the blue light beams BL belong, irrespective of the polarization state of the yellow optical component in addition to the polarization separation function.

The S-polarized light beams BLs reflected off the polarization separator 25 enter the first light collection system 26. The first light collection system 26 causes the light beams BLs to converge toward the wavelength converter 40. The first light collection system 26 is formed of a first lens 26a and a second lens 26b. The first lens 26a and the second lens 26b are each formed of a convex lens. The light beams BLs having exited out of the first light collection system 26 are incident in the form of a collected light flux on the wavelength converter 40.

The wavelength converter 40 converts the light beams BLs, which belong to a blue wavelength band, which is the first wavelength band, into fluorescence YL (second light), which belongs to a second wavelength band different from the first wavelength band. In the present embodiment, a fixed wavelength converter configured not to be rotatable, for example, with a motor is used as the wavelength converter 40. The configuration of the wavelength converter 40 will be described later in detail.

The yellow fluorescence YL produced by the wavelength converter 40 is parallelized by the first light collection system 26 and then incident on the polarization separator 25. The fluorescence YL is non-polarized light. Since the polarization separator 25 is characterized in that it transmits the yellow optical component irrespective of the polarization state thereof, as described above, the fluorescence YL passes through the polarization separator 25.

On the other hand, the P-polarized light beams BLp having passed through the polarization separator 25 enter the second retardation film 28b. The second retardation film 28b is formed of a quarter wave plate disposed in the optical path between the polarization separator 25 and the diffusive reflector 30. The P-polarized light beams BLp having passed through the polarization separator 25 are converted by the second retardation film 28b, for example, into right-handed circularly polarized blue light BLc1, which then enters the second light collection system 29.

The second light collection system 29 is formed of a first lens 29a and a second lens 29b. The first lens 29a and the second lens 29b are each formed of a convex lens. The second light collection system 29 causes the blue light BLc1 to converge and impinge on the diffusive reflector 30.

The diffusive reflector 30 is disposed in the optical path of the light beams BLp having passed through the polarization separator 25 and diffusively reflects the blue light BLc1 having exited out of the second light collection system 29 toward the polarization separator 25. The diffusive reflector 30 desirably reflects the blue light BLc1 in a Lambertian reflection scheme but does not disturb the polarization state of the blue light BLc1.

The light diffusively reflected off the diffusive reflector 30 is hereinafter referred to as blue light BLc2. In the present embodiment, the diffusively reflected blue light BLc1 forms blue light BLc2 having a substantially uniform illuminance distribution. For example, the diffusive reflector 30 diffusively reflects the right-handed circularly polarized blue light BLc1 to form the left-handed circularly polarized blue light BLc2.

The blue light BLc2 is converted by the second light collection system 29 into parallelized light and then enters the second retardation film 28b again. The left-handed circularly polarized blue light BLc2 is converted by the second retardation film 28b into S-polarized blue light BLs1. The S-polarized blue light BLs1 is reflected off the polarization separator 25 and travels toward the optical integration system 31.

The blue light BLs1 is thus combined with the fluorescence YL having passed through the polarization separator 25, and the combined light is used as the illumination light WL. That is, the blue light BLs1 and the fluorescence YL exit out of the polarization separator 25 in the same direction to form the white illumination light WL, which is the combination of the blue light BLs1 and the yellow fluorescence YL.

The illumination light WL exits toward the optical integration system 31. The optical integration system 31 is formed of a first lens array 311 and a second lens array 312. The first lens array 311 is formed of a plurality of lenses 311a arranged in an array. The first lens array 312 is formed of a plurality of lenses 312a arranged in an array.

The illumination light WL having passed through the optical integration system 31 enters the polarization converter 32. The polarization converter 32 includes polarization separation films and retardation films. The polarization converter 32 converts the illumination light WL containing the non-polarized fluorescence YL into linearly polarized light to be incident on the light modulators 4R, 4G, and 4B.

The illumination light WL having passed through the polarization converter 32 enters the superimposing lens 33. The superimposing lens 33 cooperates with the optical integration system 31 to homogenize the illuminance distribution of the illumination light WL in the image formation regions of the light modulators 4R, 4G, and 4B, which are each an illumination receiving region. The illuminator 2 thus produces the illumination light WL.

The wavelength converter 40 in the present embodiment will be described below.

Figure 3:
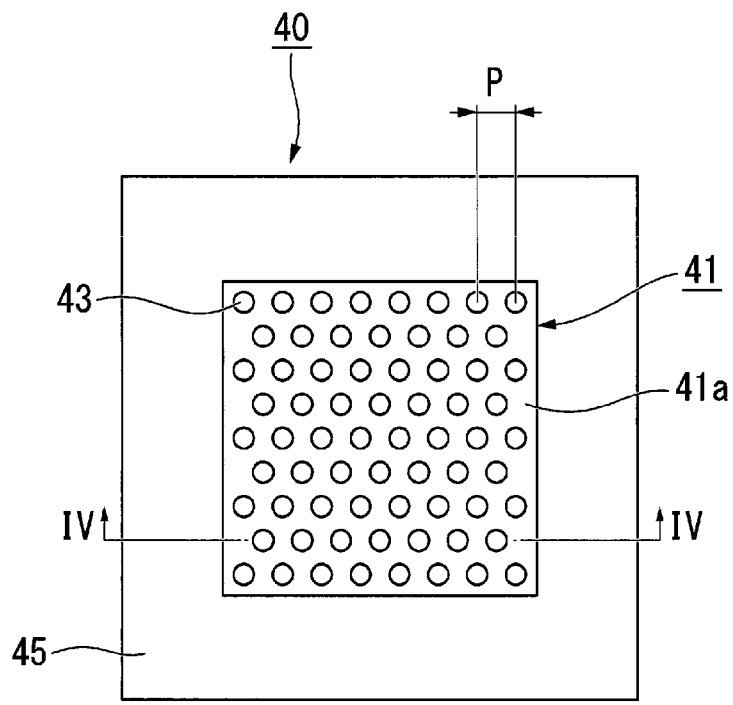
FIG. 3 is a plan view of a wavelength converter according to the first embodiment.
Figure 4:
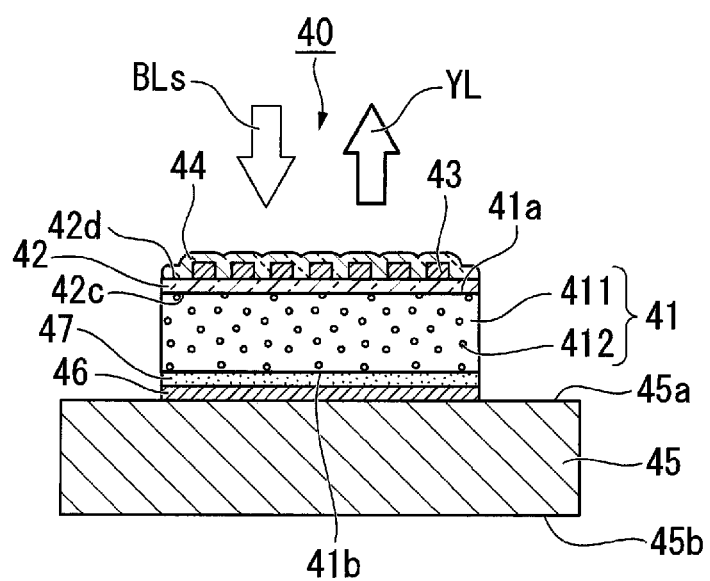
FIG. 4 is a cross-sectional view of the wavelength converter taken along the line IV-IV in FIG. 3.

FIG. 3 is a plan view of the wavelength converter 40. FIG. 4 is a cross-sectional view of the wavelength converter 40 taken along the line IV-IV in FIG. 3.

The wavelength converter 40 includes a wavelength conversion layer 41, a transparent member 42, a plurality of nano-antennas 43, a protective layer 44, a substrate 45, a reflection layer 46, and a bonding layer 47, as shown in FIGS. 3 and 4.

The wavelength conversion layer 41 has a first surface 41a, on which excitation light BLs is incident, and a second surface 41b, which differs from the first surface 41a, as shown in FIG. 4. That is, the wavelength converter 40 according to the present embodiment is a wavelength converter that causes the excitation light BLs to be incident via one surface of the wavelength conversion layer 41 and the fluorescence YL to exit via the one surface or what is called a reflective wavelength converter. The wavelength conversion layer 41 has a rectangular shape when viewed along the direction perpendicular to the first surface 41a, as shown in FIG. 3. The view viewed along the direction perpendicular to the first surface 41a of the wavelength converter 40 is hereinafter referred to as a plan view. The light beams BLs, which belong to the blue wavelength band, enter the wavelength conversion layer 41, and excite the phosphor are referred to as the excitation light BLs in the following description.

The wavelength conversion layer 41 contains a ceramic phosphor that converts the excitation light BLs into the fluorescence YL (second light), which belongs to the second wavelength band different from the first wavelength band to which the excitation light BLs belongs. The second wavelength band ranges, for example, from 490 to 750 nm, and the fluorescence YL is yellow light containing the green optical component and the red optical component. The wavelength conversion layer 41 may contain a single crystal phosphor.

The wavelength conversion layer 41 includes a bulk-shaped inorganic phosphor 411 and a plurality of light scatterers 412, which are dispersed in the inorganic phosphor 411. The refractive index of the plurality of light scatterers 412 differs from the refractive index of the inorganic phosphor 411. The wavelength conversion layer 41, which contains the plurality of light scatterers 412 dispersed in the inorganic phosphor 411, is characterized in that the light scatterers 412 scatter light propagating in the wavelength conversion layer 41. The wavelength conversion layer 41 desirably has a thickness, for example, greater than or equal to 10 μm but smaller than or equal to 100 μm.

The inorganic phosphor 411 can, for example, be an yttrium-aluminum-garnet-based ($Y_3Al_5O_{12}$:$Ce^{3+}$ (YAG)-based) phosphor containing cerium as an activator, (Sr, Ba)$_2$SiO$_4$:Eu$^{2+}$-based phosphor, Ca$_x$(Si, Al)$_{12}$(O,N)$_{16}$:Eu$^{2+}$-based phosphor, or any other phosphor that emits yellow light. A phosphor that is the mixture of a green phosphor and a red phosphor may be used as the inorganic phosphor 411 that emits yellow light. In this case, the following phosphors can be used as the green phosphor: Lu$_3$Al$_5$O$_{12}$:Ce$^{3+}$-based phosphor; Y$_3$O$_4$:Eu$^{2+}$-based phosphor; (Ba, Sr)$_2$SiO$_4$:Eu$^{2+}$-based phosphor; Ba$_3$Si$_6$O$_{12}$N$_2$:Eu$^{2+}$-based phosphor; and (Si, Al)$_6$(O, N)$_8$:Eu$^{2+}$-based phosphor. The following phosphors can be used as the red phosphor: CaAlSiN$_3$:Eu$^{2+}$-based phosphor; Ca$_2$Si$_5$N$_8$:Eu$^{2+}$-based phosphor; (Ba,Sr)$_2$SiO$_4$:Eu$^{2+}$-based phosphor; Ba$_3$Si$_6$O$_{12}$N$_2$:Eu$^{2+}$-based phosphor; KSiF$_6$:Mn$^{4+}$-based phosphor; and KTiF$_6$:Mn$^{4+}$-based phosphor.

The light scatterers 412 can be pores. For example, when a YAG sintered compact is used as the inorganic phosphor 411, pores can be left in the vicinity of the YAG grain boundary by adjusting the sintering temperature when the YAG is sintered. A wavelength conversion layer in which the plurality of light scatterers 412 are dispersed in the inorganic phosphor 411 can thus be produced. The pores, that is, air has a refractive index of 1.0. The difference in the refractive index between the inorganic phosphor 411 and the light scatterers 412 when pores are used as the light scatterers 412 is therefore greater than the difference in a case where another low-refractive-index material is used. Pores are therefore preferable as the light scatterers 412. It is, however, noted that the light scatterers 412 may not necessarily be pores and may be particles having a refractive index different from the refractive index of the inorganic phosphor.

The transparent member 42 has a third surface 42c and a fourth surface 42d and is so provided that the third surface 42c faces the first surface 41a of the wavelength conversion layer 41. The transparent member 42 is desirably made of a material having a refractive index equal to the refractive index of the wavelength conversion layer 41 or a material having a refractive index greater than the refractive index of the wavelength conversion layer 41. When the wavelength conversion layer 41 is made of YAG, the refractive index of which is 1.82, sapphire glass, which has a refractive index of 1.77, or optical glass N-SF57 (manufactured by Schott AG), which has a refractive index of 1.85 can be used as the material of the transparent member 42. The term "transparent" of the transparent member 42 means that the transparent member 42 has no light scatterer therein and therefore does not scatter light.

The thickness of the transparent member 42 only needs to be greater than or equal to the wavelength of the fluorescence YL. Therefore, the transparent member 42 does not need to be formed of a plate made, for example, of glass and may be formed of a thin film formed on the first surface 41a of the wavelength conversion layer 41. The thin film can be made of silicon nitride (Si$_3$N$_4$) having a refractive index of 2.03, hafnium dioxide (HfO$_2$) having a refractive index of 2.12, tantalum pentoxide (Ta$_2$O$_5$) having a refractive index of 2.14, titanium oxide (TiO$_2$) having a refractive index of 2.44, or any other relevant material.

The plurality of nano-antennas 43 are provided on the fourth surface 42d of the transparent member 42. The plurality of nano-antennas 43 cause light that belongs to a specific wavelength band out of the yellow wavelength band, which is the second wavelength band to which the fluorescence YL belongs, for example, a red wavelength band (third light) to selectively exit along the direction of a normal to the fourth surface 42d. In the present embodiment, the red wavelength band is set as the specific wavelength band described above, and any wavelength band out of the second wavelength band, to which the fluorescence YL belongs, may instead be set as the specific wavelength band. The direction of a normal to the fourth surface 42d is hereinafter simply referred to as a normal direction.

The plurality of nano-antennas 43 are each formed of a columnar element made, for example, of silver (Ag), aluminum (Al), or silicon (Si). The columnar elements each have a planar shape, for example, a circular or polygonal shape when viewed along the normal direction. The circular or polygonal planar shape of each of the nano-antennas 43 has a diameter of, for example, 150 nm. The nano-antennas 43 each have a height, for example, of 150 nm. The plurality of nano-antennas 43 can therefore be formed, for example, by patterning a thin film made of silver, aluminum, or any other metal or silicon or any other semiconductor and having a thickness of 150 nm. The nano-antennas 43 do not necessarily have a columnar shape and may instead have, for example, a conical shape, a pyramidal shape, a truncated conical shape, or a truncated pyramidal shape. The nano-antennas 43 may be made of an alloy of some of the materials described above or may be formed of a laminate made of some of the materials described above.

The plurality of nano-antennas 43 are arranged in a triangular lattice with the triangles arranged at predetermined intervals P in the plan view, as shown in FIG. 3. An optimum interval P between two adjacent nano-antennas 43 is determined by the refractive index of the transparent member 42 adjacent to the nano-antennas 43 and the wavelength of light desired to be diffracted in the normal direction. When the wavelength of light desired to be diffracted in the normal direction is set, for example, at 610 nm, and the transparent member 42 is made of sapphire glass, the optimum interval P between the nano-antennas 43 is 400 nm. When the transparent member 42 is made of the optical glass N-SF57, the optimum interval P between the nano-antennas 43 is 380 nm. When the transparent member 42 is made of $HfO_2$ or $Ta_2O_5$, the optimum interval P between the nano-antennas 43 is 330 nm. When the transparent member 42 is made of $TiO_2$, the optimum interval P between the nano-antennas 43 is 290 nm. The plurality of nano-antennas 43 may not necessarily be arranged in a triangular lattice and may be arranged, for example, in a square lattice and only need to be arranged at fixed intervals.

The protective layer 44 is so provided on the fourth surface 42d of the transparent member 42 as to cover the plurality of nano-antennas 43. The protective layer 44 transmits the excitation light BLs and the fluorescence YL. The refractive index of the protective layer 44 is desirably substantially equal to the refractive index of the transparent member 42. The protective layer 44 can therefore be made of the same material as that of the transparent member 42, for example, $Si_3N_4$, $HfO_2$, $Ta_2O_5$, or $TiO_2$. The protective layer 44 only needs to be provided as required and may not be provided.

The substrate 45 has a first surface 45a and a second surface 45b and is so provided that the first surface 45a faces the second surface 41b of the wavelength conversion layer 41 via the reflection layer 46 and the bonding layer 47, which will be described later. The substrate 45 is desirably made of a metal having relatively high thermal conductivity, for example, copper (Cu) and aluminum (Al). A heat dissipating member, such as a heat sink, may be provided on the second surface 45b of the substrate 45.

The reflection layer 46 is so provided on the first surface 45a of the substrate 45 as to face the second surface 41b of the wavelength conversion layer 41. The reflection layer 46 reflects at least the fluorescence YL. The reflection layer 46 is made, for example, of a metal having relatively high reflectance, such as silver (Ag) and aluminum (Al), or formed of a dielectric multilayer film. In the example shown in FIG. 4, the reflection layer 46 is provided, out of the first surface 45a of the substrate 45, only in the region where the wavelength conversion layer 41 is formed, and may instead be formed on the entire first surface 45a of the substrate 45 including the region excluding the region where the wavelength conversion layer 41 is formed.

The bonding layer 47 is provided between the wavelength conversion layer 41 and the reflection layer 46 and bonds the wavelength conversion layer 41 and the reflection layer 46 to each other. The bonding layer 47 is made, for example, of a resin material, such as silicon resin, or a metal material, such as, silver paste.

The action of the wavelength converter 40 according to the present embodiment will be described below.

In the wavelength converter 40 according to the present embodiment, in which the wavelength conversion layer 41 contains the light scatterers 412, the excitation light BLs having entered the wavelength conversion layer 41 is scattered in a multiple scattering manner by the light scatterers 412 in the wavelength conversion layer 41. Substantially the entire excitation light BLs is thus converted in terms of wavelength into the fluorescence YL. When the fluorescence YL impinges on the nano-antennas 43 at the angle that causes in-plane light diffraction called Rayleigh anomaly, the in-plane light diffraction causes the fluorescence YL to propagate in such a way that the fluorescence YL excites metal particles that form the individual nano-antennas 43 to produce localized surface plasmon. Large electric field enhancement thus occurs. The thus enhanced electric field radiates light having a specific wavelength determined by the interval P between the nano-antennas 43 and traveling in the normal direction with strong directivity. Some of the fluorescence YL is radiated from the nano-antennas 43 toward the substrate 45 but is reflected off the reflection layer 46 and propagates again toward the nano-antennas 43.

The present inventor has studied a condition under which the wavelength conversion layer 41 can convert substantially the entire excitation light BLs in terms of wavelength, and the condition will be described below.

Figure 5:
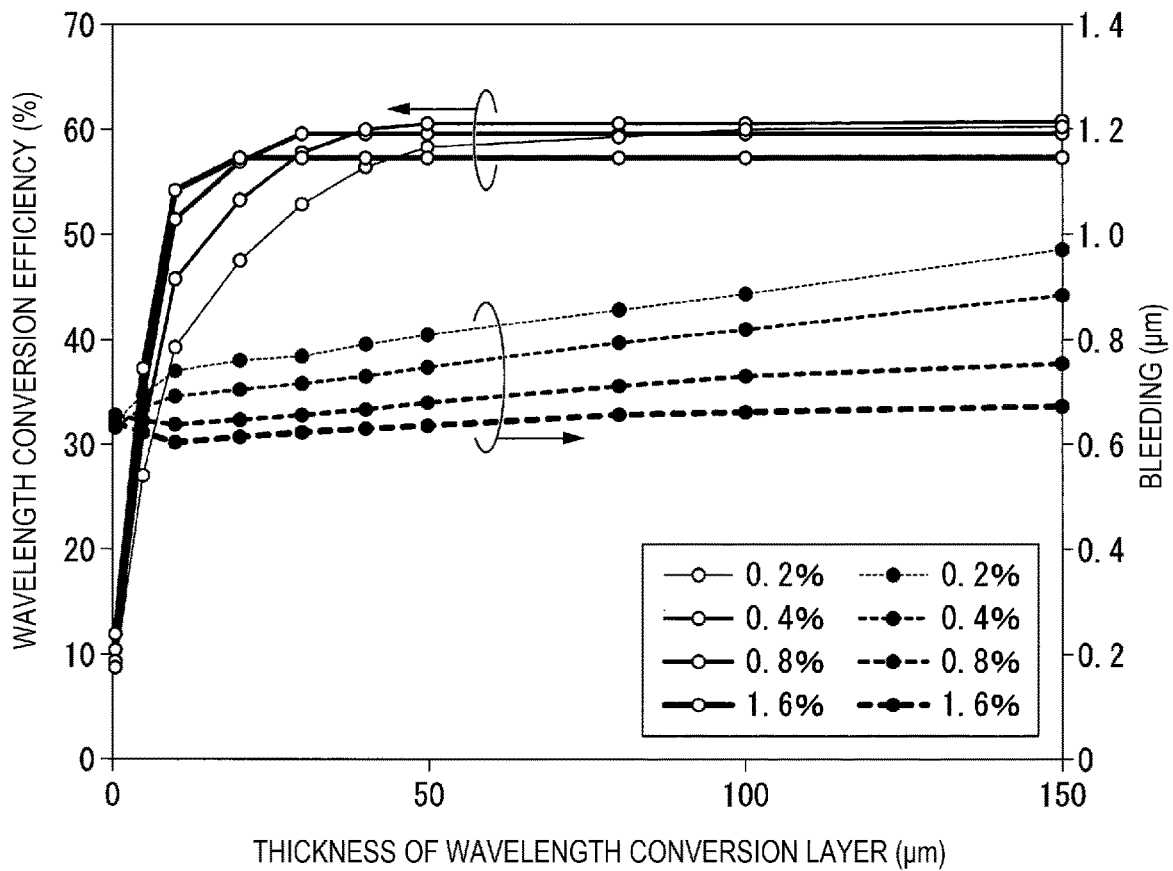
FIG. 5 shows graphs illustrating the relationship among the thickness of a phosphor layer, wavelength conversion efficiency, and bleeding of fluorescence.

FIG. 5 shows the effect of the thickness of the wavelength conversion layer 41 and the amount of light scatterers 412 contained in the wavelength conversion layer 41 on the wavelength conversion efficiency. In FIG. 5, the horizontal axis represents the thickness (μm) of the wavelength conversion layer 41, the left vertical axis represents the wavelength conversion efficiency (%), and the right vertical axis represents the amount of the fluorescence YL bleeding from the wavelength conversion layer 41. Pores were used as the light scatterers 412, the contained amount of light scatterers 412 was expressed in the ratio of the volume of the light scatterers 412 to the total volume of the wavelength conversion layer 41, and the effect was calculated by changing the ratio to four values, 0.2%, 0.4%, 0.8%, and 1.6%. The bleeding of the fluorescence YL is a phenomenon in which the fluorescence YL spreads outward and exits out of the region where the excitation light BLs is incident as a result of lateral propagation of the fluorescence YL scattered by the light scatterers 412 (propagation in direction that intersects thickness direction of wavelength conversion layer 41).

The wavelength conversion efficiency is about 40% or higher when the thickness of the wavelength conversion layer 41 is at least 10 μm, and the wavelength conversion efficiency is stably about 60% when the thickness of the wavelength conversion layer 41 is 50 μm or greater, as shown in FIG. 5, although the values slightly vary in accordance with the contained amount of light scatterers 412. Conversely, when the wavelength conversion layer 41 is thinner than 10 μm, the wavelength conversion efficiency abruptly decreases. Conversely, when the wavelength conversion layer 41 is thicker than 50 μm, the wavelength conversion efficiency is hardly improved, but the amount of bleeding of the fluorescence YL gradually increases. When the amount of bleeding of the fluorescence YL increases, the area over which the wavelength conversion layer 41 emits light increases, resulting in an increase in etendue, followed by, for example, a decrease in projection efficiency of a projector using the wavelength converter 40. The results described above show that the thickness of the wavelength conversion layer 41 is desirably greater than or equal to 10 μm but smaller than or equal to 50 μm.

As described above, in the wavelength converter 40 according to the present embodiment, when the wavelength conversion layer 41 is irradiated with the blue excitation light BLs having the peak wavelength of 455 nm, the fluorescence YL corresponding about 60% of the amount of excitation light BLs can be extracted. In the case of the wavelength converter described in JP-A-2018-13688 described above, in which the wavelength conversion layer does not scatter light, the incident excitation light could be sufficiently absorbed by the phosphor. In contrast, in the case of the wavelength converter 40 according to the present embodiment, in which the wavelength conversion layer 41 contains the plurality of light scatterers 412, the excitation light BLs undergoes multiple scattering in the wavelength conversion layer 41, resulting in an increase in the substantial optical path length of the excitation light BLs, whereby the excitation light BLs is sufficiently absorbed by the phosphor. The wavelength converter 40 according to the present embodiment thus allows an increase in the wavelength conversion efficiency as compared with the wavelength conversion efficiency achieved by the wavelength converter described in JP-A-2018-13688.

Further, in the present embodiment, in which the wavelength converter 40 includes the plurality of nano-antennas 43, light having a specific wavelength that is within the wavelength band of the fluorescence YL can be extracted in the normal direction with high directivity.

Figure 6:
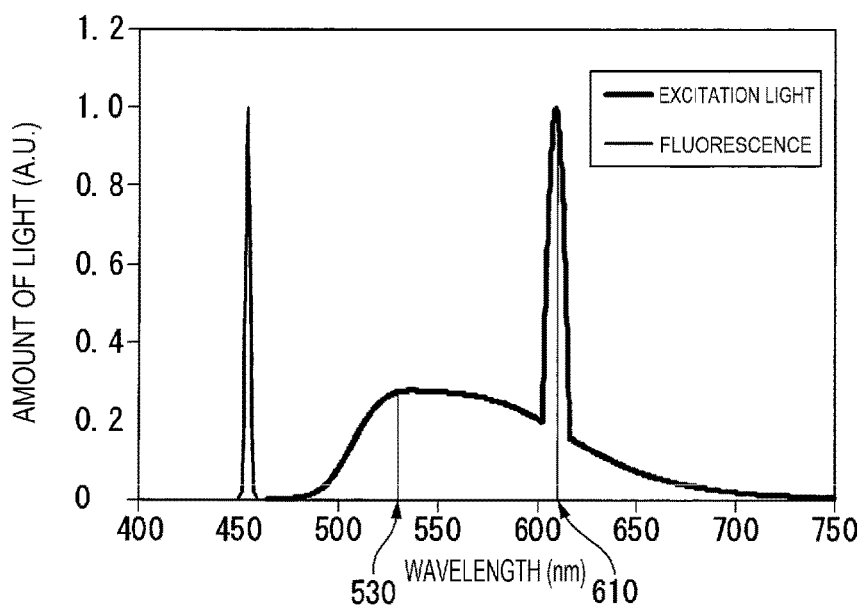
FIG. 6 shows the spectra of excitation light and fluorescence.

FIG. 6 shows the spectrum of the excitation light BLs and the spectrum of the fluorescence YL, the latter measured along the normal direction, in the wavelength converter 40 according to the present embodiment. In FIG. 6, the horizontal axis represents the wavelength (nm), and the vertical axis represents the amount of light (a.u.).

FIG. 6 shows that the fluorescence YL produced by the phosphor has a gentle spectrum, and that the spectrum has a sharp peak at a wavelength of 610 nm. The peak corresponds to high-directivity light resulting from the light diffraction caused by the electric field enhanced by the localized surface plasmon excited by the nano-antennas 43. In FIG. 6, the peak wavelength of the fluorescence YL is about 530 nm, which is within the green wavelength band. In contrast, the peak wavelength of the light diffracted by the nano-antennas 43 in the normal direction is about 610 nm. As described above, the light diffracted by the nano-antennas 43 in the normal direction differs from the peak wavelength of the fluorescence YL.

In general, a YAG:Ce-based phosphor is characterized in that the fluorescence produced by the phosphor has a small amount of red optical component. Therefore, when the fluorescence produced by a YAG:Ce-based phosphor is used as the illumination light from a display apparatus, such as a projector, it is difficult to achieve satisfactory white balance. In view of the fact described above, satisfactory white balance is ensured, for example, by discarding about 40% of the green optical component from the fluorescence, resulting in a problem of poor light use efficiency because part of the optical components is discarded in the method. To solve the problem, the wavelength converter 40 according to the present embodiment, in which the amount of discarded green optical component can be reduced by increasing the red optical component, as shown in FIG. 6, allows a large increase in the light use efficiency.

Also in the wavelength converter described in JP-A-2018-13688, it is conceivable to mix the wavelength conversion layer with light scatterers to increase the wavelength conversion efficiency at which the excitation light is converted in terms of wavelength. In the configuration described in JP-A-2018-13688, however, simply mixing the wavelength conversion layer with light scatterers results in the light scatterers located in the immediate vicinity of the nano-antennas. The configuration described above has a problem of a decrease in the amount of light diffracted in the normal direction as a result of an adverse effect of the light scatterers on the optical diffraction performed by the nano-antennas.

In contrast, in the wavelength converter 40 according to the present embodiment, in which the transparent member 42 interposed between the wavelength conversion layer 41, in which the light scatterers 412 are dispersed, and the nano-antennas 43, the transparent member 42 reduces the effect of the light scatterers 412 on the nano-antennas 43. As a result, the nano-antennas 43 can sufficiently diffract the light in the normal direction. The wavelength converter 40 according to the present embodiment can therefore boost the effect of enhancing an optical component having a specific wavelength, as compared with a case where no transparent member is interposed between the wavelength conversion layer and the nano-antennas.

Further, the wavelength converter 40 according to the present embodiment, in which the protective layer 44 covers the plurality of nano-antennas 43, can suppress separation and damage of the nano-antennas 43.

In the present embodiment, the refractive index of the protective layer 44 is equal to the refractive index of the transparent member 42. In place of the configuration described above, the refractive index of the protective layer 44 may differ from the refractive index of the transparent member 42. That is, the refractive index of the protective layer 44 may be intentionally caused to differ from the refractive index of the transparent member 42, for example, by forming the protective layer 44 and the transparent member 42 with different materials.

The configuration in which the refractive index of the protective layer 44 differs from the refractive index of the transparent member 42 allows a greater width of the wavelength of the light diffracted in the normal direction. For example, assuming that the transparent member 42 is made of sapphire glass and the protective layer 44 is made of $HfO_2$, the light having the peak wavelength of 610 nm and the light having a peak wavelength of 635 nm are diffracted in the normal direction, whereby the wavelength of the extracted light is widened. When the wavelength of the light diffracted in the normal direction is widened, color unevenness resulting from a variety of types of interference that occur when the light modulators 4R, 4G, and 4B are illuminated can be suppressed, and the color rendering property is improved.

In the wavelength converter 40 according to the present embodiment, the yellow fluorescence YL has a Lambertian light orientation distribution and exits over a large angular range. In contrast, the red light having the wavelength of 610 nm exits over a narrow angular range and undergoes a wavelength shift corresponding to the light exiting angle. Using the illumination light from the light source apparatus 20 as it is therefore likely to cause color unevenness in an image. In contrast, in the illuminator 2 in the present embodiment, the illumination light WL from the light source apparatus 20 passes through the optical integration system 31, as shown in FIG. 2, so that the illuminance of the illumination light WL is homogenized in the image formation region of each of the light modulators 4R, 4G, and 4B, whereby the color unevenness in an image is reduced. Configuring the optical integration system 31 with a larger number of lenses allows greater improvement in the color uniformity of the image.

Second Embodiment

A second embodiment of the present disclosure will be described below with reference to FIGS. 7 and 8.

The basic configuration of a projector according to the second embodiment is the same as that in the first embodiment, and the configurations of the illuminator and the wavelength converter differ from those in the first embodiment. The entire description of the projector will therefore not be made.

Figure 7:
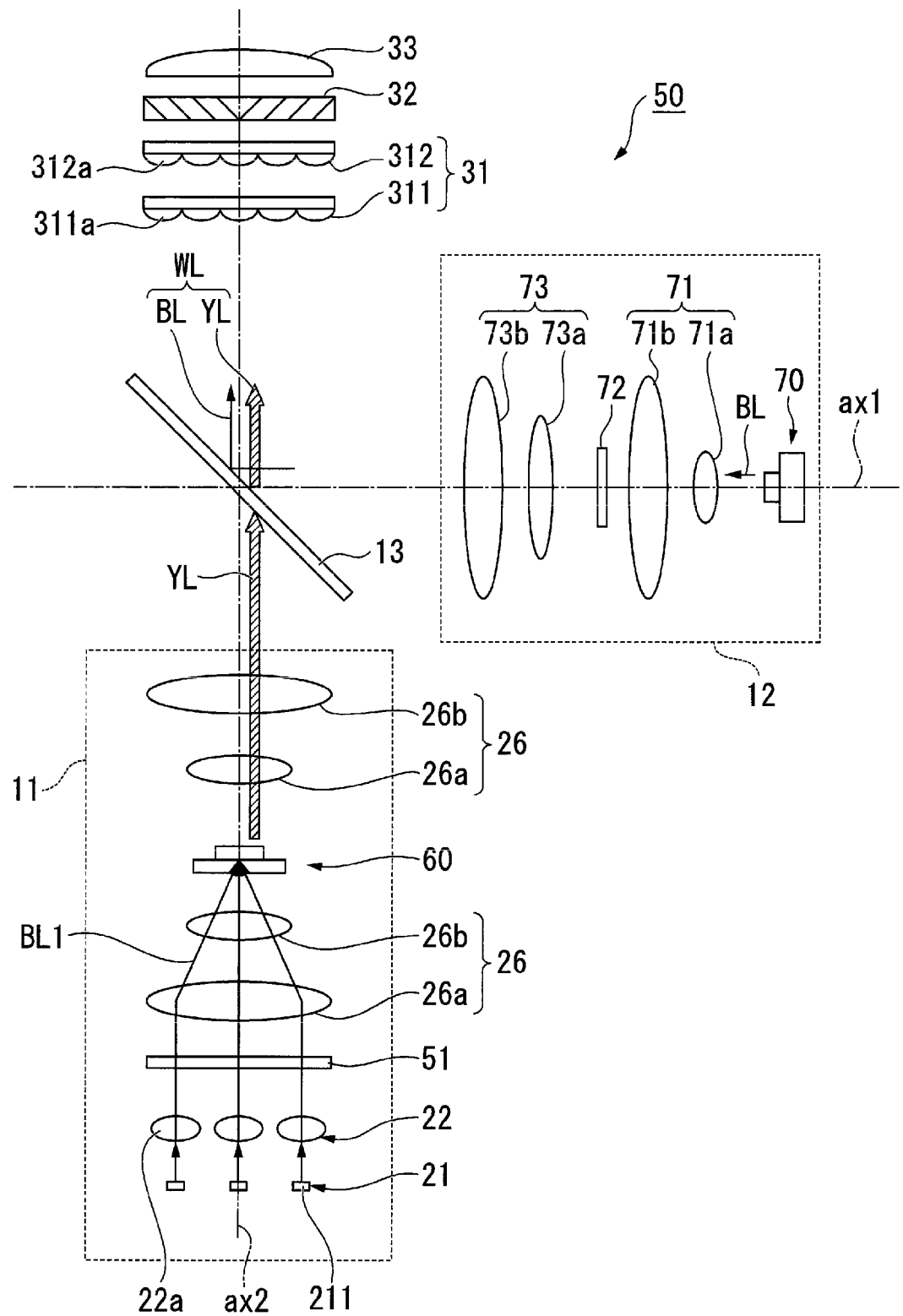
FIG. 7 is a schematic configuration diagram of an illuminator in a second embodiment.

FIG. 7 is a schematic configuration diagram of the illuminator in the present embodiment. FIG. 8 is a cross-sectional view of the wavelength converter according to the present embodiment.

Figure 8:
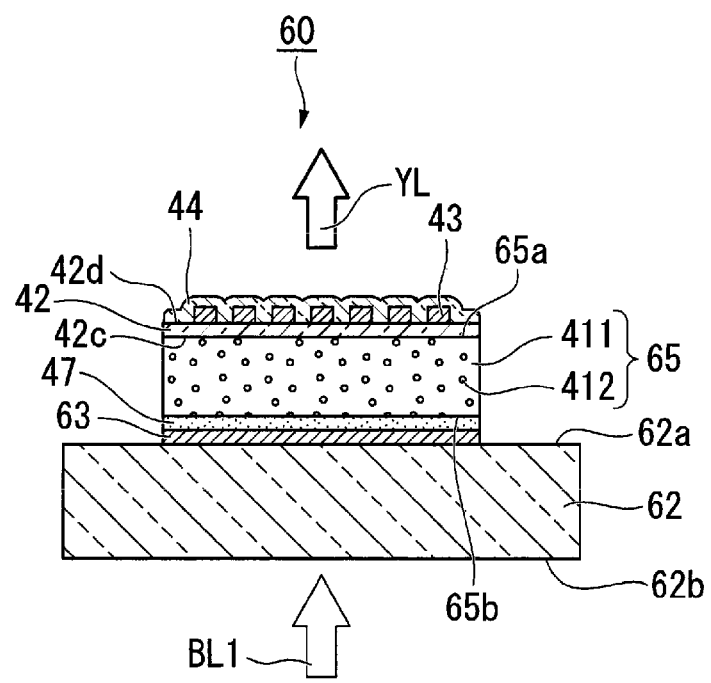
FIG. 8 is a cross-sectional view of a wavelength converter according to the second embodiment.

In FIGS. 7 and 8, the same components as those in the first embodiment have the same reference characters and will not be described.

An illuminator 50 in the present embodiment includes a first light source apparatus 11, a second light source apparatus 12, a dichroic mirror 13, the optical integration system 31, the polarization converter 32, and the superimposing lens 33, as shown in FIG. 7. In the present embodiment, the first light source apparatus 11 corresponds to the light source apparatus in the appended claims.

The first light source apparatus 11 includes the array light source 21, the collimator system 22, a first diffuser 51, the first light collection system 26, a wavelength converter 60, and a first pickup system 27. The first diffuser 51 diffuses excitation light BL1 emitted from the array light source 21. In the present embodiment, the first diffuser 51 is formed, for example, of a ground glass plate made of optical glass. The configuration of the wavelength converter 60 will be described later.

The second light source apparatus 12 includes a second light source 70, a second light collection system 71, a second diffuser 72, and a second pickup system 73.

The second light source 70 has the same configuration as that of the array light source 21. In the present embodiment, the second light source 70 includes semiconductor lasers that each emit the blue light beam BL and collimator lenses that parallelize the blue light beams BL emitted from the semiconductor lasers. The second light source 70 may include at least one semiconductor laser and at least one collimator lens or may include a plurality of semiconductor lasers and a plurality of collimator lenses, as does the array light source 21.

The second light collection system 71 includes a first lens 71a and a second lens 71b. The second light collection system 71 collects each of the blue light beams BL emitted from the second light source 70 into a spot in the vicinity of the second diffuser 72. The first lens 71a and the second lens 71b are each formed of a convex lens.

The second diffuser 72 diffuses and converts the blue light beams BL having exited out of the second light collection system 71 into blue light beams BL having a light orientation distribution similar to the light orientation distribution of the fluorescence YL produced in the first light source apparatus 11. The second diffuser 72 is formed, for example, of a ground glass plate made of optical glass.

The second pickup system 73 includes a first lens 73a and a second lens 73b. The second pickup system 73 substantially parallelizes the blue light beams BL having exited out of the second diffuser 72. The first lens 73a and the second lens 73b are each formed of a convex lens.

In the present embodiment, the blue light beams BL from the second light source apparatus 12 are reflected off the dichroic mirror 13. The blue light beams BL reflected off the dichroic mirror 13 and emitted from the first light source apparatus 11 are then combined with the yellow fluorescence YL having passed through the dichroic mirror 13 into white illumination light WL.

The other configurations of the illuminator 50 are substantially the same as those in the first embodiment.

The wavelength converter 60 according to the present embodiment includes a wavelength conversion layer 65, the transparent member 42, the plurality of nano-antennas 43, the protective layer 44, a substrate 62, a dichroic layer 63, and the bonding layer 47, as shown in FIG. 8. The wavelength converter 40 according to the first embodiment is a reflective wavelength converter, whereas the wavelength converter 60 according to the present embodiment is a wavelength converter on which the excitation light BL1 is incident via a second surface 65b of the wavelength conversion layer 65 and which emits the fluorescence YL via a first surface 65a of the wavelength conversion layer 65 or what is called a transmissive wavelength converter.

The substrate 45 in the first embodiment is made, for example, of a material that transmits no light, such as copper and aluminum, whereas the substrate 62 in the present embodiment is made, for example, of a material that transmits light, such as sapphire glass or any other type of glass and quartz.

The dichroic layer 63 is so provided on a first surface 62a of the substrate 62 as to face the second surface 65b of the wavelength conversion layer 65. The dichroic layer 63 is characterized in that it transmits the excitation light BL1 and reflects the fluorescence YL. Therefore, the excitation light BL1 passes through the dichroic layer 63 and enters the wavelength conversion layer 65, and out of the fluorescence YL, the fluorescence YL traveling toward the substrate 62 is reflected off the dichroic layer 63 and travels toward the first surface 65a of the wavelength conversion layer 65. The dichroic layer 63 is formed, for example, of a dielectric multilayer film.

The wavelength converter 60 according to the present embodiment, which is a transmissive wavelength converter, differs from the wavelength converter according to the first embodiment and does not provide the effect of causing the excitation light to be reflected off the reflection layer to provide a substantial optical path length of the excitation light that has a thickness twice the thickness of the wavelength conversion layer. The wavelength conversion layer 65 in the present embodiment therefore needs to have a thickness approximately twice the thickness of the wavelength conversion layer 41 in the first embodiment. The wavelength conversion layer 65 in the present embodiment therefore has a thickness, for example, ranging from about 20 to 100 μm. It is, however, noted that the configuration of the wavelength conversion layer 65 is the same as the configuration of the wavelength conversion layer 41 in the first embodiment.

The other configurations of the wavelength converter 60 are the same as those in the first embodiment.

The present embodiment also provides the same effects as those provided by the first embodiment. That is, a wavelength converter 60 having high wavelength conversion efficiency and capable of extracting light having a specific wavelength that is within the wavelength band of the fluorescence YL with high directivity can be achieved, and a projector that has high light use efficiency and excels in image quality can be achieved.

The technical range of the present disclosure is not limited to those in the embodiments described above, and a variety of changes can be made to the embodiments to the extent that the changes do not depart from the substance of the present disclosure.

For example, in the wavelength converter according to each of the embodiments described above, a reflection layer may be provided on the side surface of the wavelength conversion layer to suppress light leakage via the side surface of the wavelength conversion layer. Instead, it is conceivable to employ, for example, a configuration in which no reflection layer is provided on the side surface of the wavelength conversion layer and the excitation light is incident via the side surface of the wavelength conversion layer or the fluorescence exits via the side surface of the wavelength conversion layer.

In addition to the above, the specific description of the shape, the number, the arrangement, the material, and other factors of the components of the wavelength converter, the light source apparatus, and the projector are not limited to those in the embodiments described above and can be changed as appropriate. In the embodiments described above, the case where the light source apparatus according to the present disclosure is incorporated in a projector using liquid crystal light valves is presented by way of example, but not necessarily. The light source apparatus according to the present disclosure may be used in a projector using digital micromirror devices as the light modulators. The light source apparatus according to the present disclosure may instead be used in an image display apparatus, such as a head mounted display and a head-up display. The light source apparatus according to the present disclosure may still instead be used in another image display apparatus using a laser light source, for example, a large liquid crystal television receiver.

In the embodiments described above, the case where the light source apparatus according to the present disclosure is used in a projector is presented by way of example, but not necessarily. The light source apparatus according to the present disclosure may be used in an illuminator that requires white light having high directivity and intensity, for example, a headlight of an automobile and a spotlight.

What is claimed is:

1. A wavelength converter comprising:
a wavelength conversion layer that has a first surface and a second surface, the wavelength conversion layer configured to convert first light that belongs to a first wavelength band into second light that belongs to a second wavelength band different from the first wavelength band, and the wavelength conversion layer configured to emit the second light via the first surface;
a transparent member having a third surface and an opposing fourth surface, the third surface so provided as to face the first surface of the wavelength conversion layer; and
a plurality of nano-antennas provided on the fourth surface of the transparent member,
wherein the wavelength conversion layer contains light scatterers,
wherein the plurality of nano-antennas are configured to selectively emit third light along a direction that is normal to the fourth surface of the transparent member, and
wherein the third light belongs to a third wavelength band that is a part of the wavelength band included in the second wavelength band.

2. The wavelength converter according to claim 1, further comprising a protective layer that is so provided on the fourth surface of the transparent member as to cover the plurality of nano-antennas and is configured to transmit at least the second light.

3. The wavelength converter according to claim 2, wherein a refractive index of the protective layer differs from a refractive index of the transparent member.

4. The wavelength converter according to claim 1,
wherein the first light enters the wavelength conversion layer via the first surface, and
the wavelength converter further comprises a reflection layer that is so provided as to face the second surface of the wavelength conversion layer and is configured to reflect at least the second light.

5. The wavelength converter according to claim 1,
wherein the first light enters the wavelength conversion layer via the second surface, and
the wavelength converter further comprises a dichroic layer that is so provided as to face the second surface of the wavelength conversion layer, transmits the first light, and reflects the second light.

6. The wavelength converter according to claim 1, wherein a peak wavelength of the third light differs from a peak wavelength of the second light.

7. The wavelength converter according to claim 6,
wherein the first light is light that belongs to a blue wavelength band, and
the peak wavelength of the second light is within a green wavelength band, and the peak wavelength of the third light is within a red wavelength band.

8. A light source apparatus comprising:
the wavelength converter according to claim 1; and
a light source that emits excitation light formed of the first light toward the wavelength converter.

9. A projector comprising:
the light source apparatus according to claim 8;
a light modulator that modulates light from the light source apparatus in accordance with image information; and
a projection optical apparatus that projects the light modulated by the light modulator.

* * * * *